United States Patent
Xu et al.

(10) Patent No.: US 9,679,366 B2
(45) Date of Patent: Jun. 13, 2017

(54) GUIDED COLOR GRADING FOR EXTENDED DYNAMIC RANGE

(71) Applicant: DOLBY LABORATORIES LICENSING CORPORATION, San Francisco, CA (US)

(72) Inventors: Ning Xu, Irvine, CA (US); Tao Chen, San Francisco, CA (US); James E. Crenshaw, San Francisco, CA (US); Samir N. Hulyalkar, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/030,346

(22) PCT Filed: Oct. 21, 2014

(86) PCT No.: PCT/US2014/061600
§ 371 (c)(1),
(2) Date: Apr. 18, 2016

(87) PCT Pub. No.: WO2015/061335
PCT Pub. Date: Apr. 30, 2015

(65) Prior Publication Data
US 2016/0253792 A1  Sep. 1, 2016

Related U.S. Application Data

(60) Provisional application No. 61/894,382, filed on Oct. 22, 2013.

(51) Int. Cl.
*G09G 5/02* (2006.01)
*G06T 5/00* (2006.01)
(Continued)

(52) U.S. Cl.
CPC .............. *G06T 5/007* (2013.01); *G06T 5/008* (2013.01); *G06T 5/50* (2013.01); *H04N 1/6052* (2013.01);
(Continued)

(58) Field of Classification Search
None
See application file for complete search history.

(56) References Cited

U.S. PATENT DOCUMENTS 7,308,135 B2  12/2007  Spaulding
7,428,332 B2   9/2008  Spaulding
(Continued)

FOREIGN PATENT DOCUMENTS

| CN | 1799057 | 7/2006 |
|---|---|---|
| JP | 2007-295022 | 11/2007 |

(Continued)

OTHER PUBLICATIONS

Reinhard et al. (High Dynamic Range Video Production, Delivery and Rendering, SMPTE Motion Imagine Journal, May/Jun. 2015).*

(Continued)

*Primary Examiner* — Kyle Zhai

(57) ABSTRACT

Novel methods and systems for color grading are disclosed. The color grading process for a visual dynamic range image can be guided by information relating to the color grading of other images such as the standard dynamic range image.

18 Claims, 4 Drawing Sheets

(51) Int. Cl.

| | | |
|---|---|---|
| *H04N 1/60* | (2006.01) | |
| *H04N 9/67* | (2006.01) | |
| *G06T 5/50* | (2006.01) | |
| *H04N 1/40* | (2006.01) | |
| *H04N 5/57* | (2006.01) | |
| *H04N 21/431* | (2011.01) | |

(52) U.S. Cl.
CPC ..... *H04N 9/67* (2013.01); *G06T 2207/20208* (2013.01); *H04N 1/40006* (2013.01); *H04N 5/57* (2013.01); *H04N 21/4318* (2013.01)

(56) References Cited

U.S. PATENT DOCUMENTS

| | | | |
|---|---|---|---|
| 8,014,027 | B1 | 9/2011 | Kulkarni |
| 8,050,511 | B2 | 11/2011 | Daly |
| 8,451,340 | B2 | 5/2013 | Tamagawa |
| 2003/0234944 | A1 | 12/2003 | Gindele |
| 2011/0188744 | A1 | 8/2011 | Sun |
| 2012/0201456 | A1 | 8/2012 | El-Mahdy |
| 2012/0218442 | A1 | 8/2012 | Jandhyala |
| 2012/0236020 | A1 | 9/2012 | Paris |
| 2015/0007243 | A1 | 1/2015 | Kunkel |
| 2015/0078661 | A1* | 3/2015 | Granados ............... G06T 5/009 382/167 |

FOREIGN PATENT DOCUMENTS

| | | |
|---|---|---|
| JP | 2009-514338 | 4/2009 |
| JP | 2014-518024 | 7/2014 |
| WO | 2012/125802 | 9/2012 |
| WO | 2013/046095 | 4/2013 |
| WO | 2013/046096 | 4/2013 |

OTHER PUBLICATIONS

Tomaszewska et al. (Image Registration for Multi-exposure High Dynamic Range Image Acquisition, 2007).*
Mikolajczyk, K. et al "A Comparison of Affine Region Detectors" published in International Journal of Computer Vision, vol. 65, Issue 1-2, Nov. 2005, pp. 43-72.
Lowe, David G. "Distinctive Image Features from Scale-Invariant Keypoints" pp. 91-110, Nov. 2004.
Mikolajczyk, K. et al "A Performance Evaluation of Local Descriptors" IEEE Transactions on Pattern Analysis and Machine Intelligence, vol. 27, No. 10, Oct. 2005, pp. 1615-1630.
Bay, H. et al "SURF: Speeded Up Robust Features", ECCV, pp. 404-417, 2008.
Fischler, M. et al "Random Sample Consensus: A Paradigm for Model Fitting with Applications to Image Analysis and Automated Cartography" CACM, pp. 381-395, Jun. 1981.
Savannah, Kirt Witte "High-Dynamic-Range Imaging for Artists" published in SIGGRAPH Asia 2009, Article No. 8, ACM New York, NY, USA.
Kaplan, Fred "Rediscovering Francis Ford Coppola's Godfather Trilogy on Blu-Ray" Aug. 30, 2008.
Bonneel, N. et al "Example-Based Video Color Grading" ACM Transactions on Graphics, vol. 32, No. 4, Jul. 1, 2013, pp. 1-11.
Pouli, T. et al "Progressive Color Transfer for Images of Arbitrary Dynamic Range" Computers and Graphics, Elsevier, GB, vol. 35, No. 1, Nov. 5, 2010, pp. 67-80.
Caspi, Y. et al "Spatio-Temporal Alignment of Sequences" IEEE Transactions on Pattern Analysis and Machine Intelligence, vol. 24, No. 11, Nov. 2002, pp. 1409-1424.
Sand, P. et al "Video Matching" ACM Transactions on Graphics (Proc. SIGGRAPH) vol. 22, No. 3, Jul. 2004, pp. 592-599.
Selan, Jeremy "Cinematic Color" ACM SIGGRAPH, Aug. 5, 2012, pp. 1-54.
Banterle, F. et al "Inverse Tone Mapping" Proc. of the 4th International Conference on Computer Graphics and Interactive Techniques in Australia, Asia and Southeast Asia, ACM, Nov. 29, 2006, pp. 333-341.

* cited by examiner

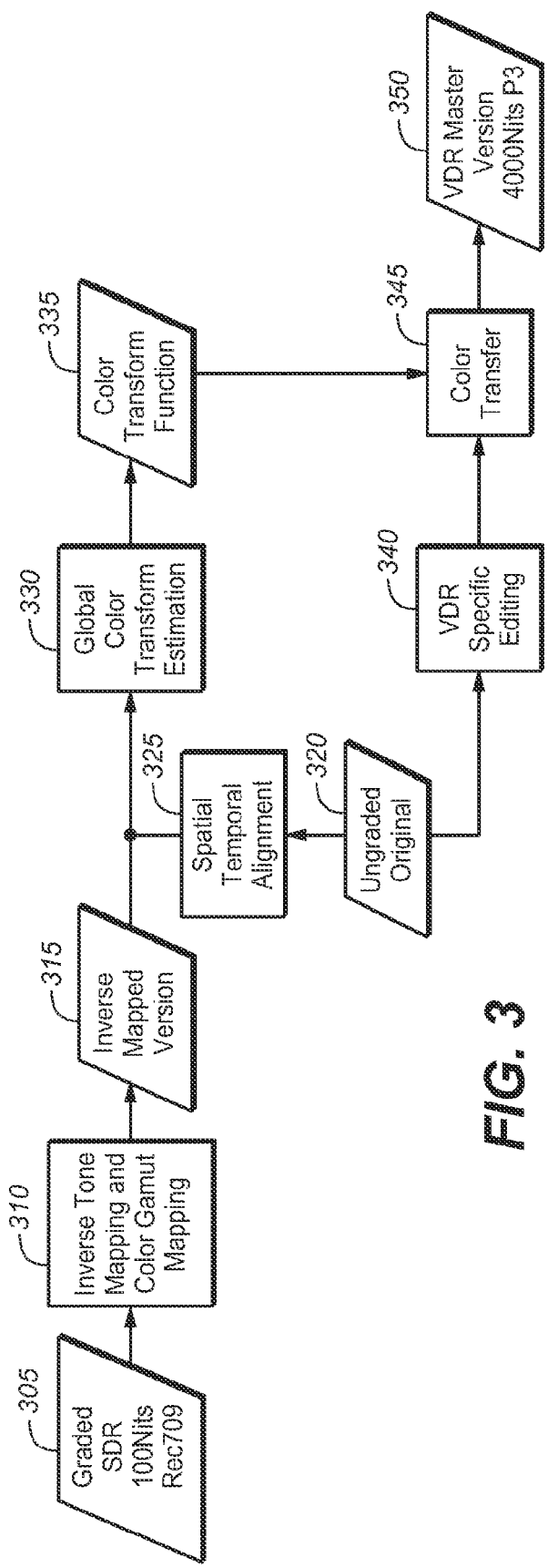
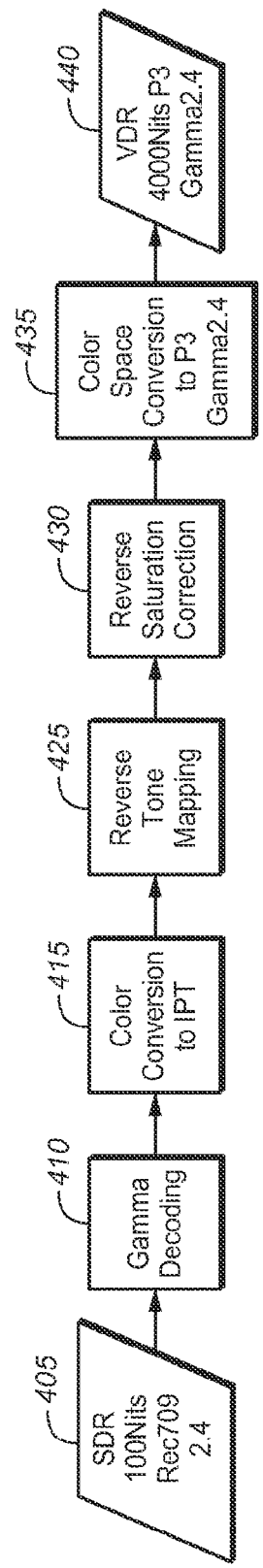
FIG. 3
FIG. 4

GUIDED COLOR GRADING FOR
EXTENDED DYNAMIC RANGE

CROSS-REFERENCE TO RELATED
APPLICATIONS

This application claims the benefit of priority to U.S. Provisional Patent Application No. 61/894,382 filed 22 Oct. 2013, which is hereby incorporated by reference in its entirety.

TECHNICAL FIELD OF THE INVENTION

The present disclosure relates to color grading of video and images. More particularly, it relates to guided color grading for extended dynamic range.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 3 shows an overview of the main steps of one embodiment of automatic re-mastering.

FIG. 4 illustrates an example of inverse tone mapping and color gamut according to an embodiment of the present invention.

SUMMARY OF THE INVENTION

Figure 1:
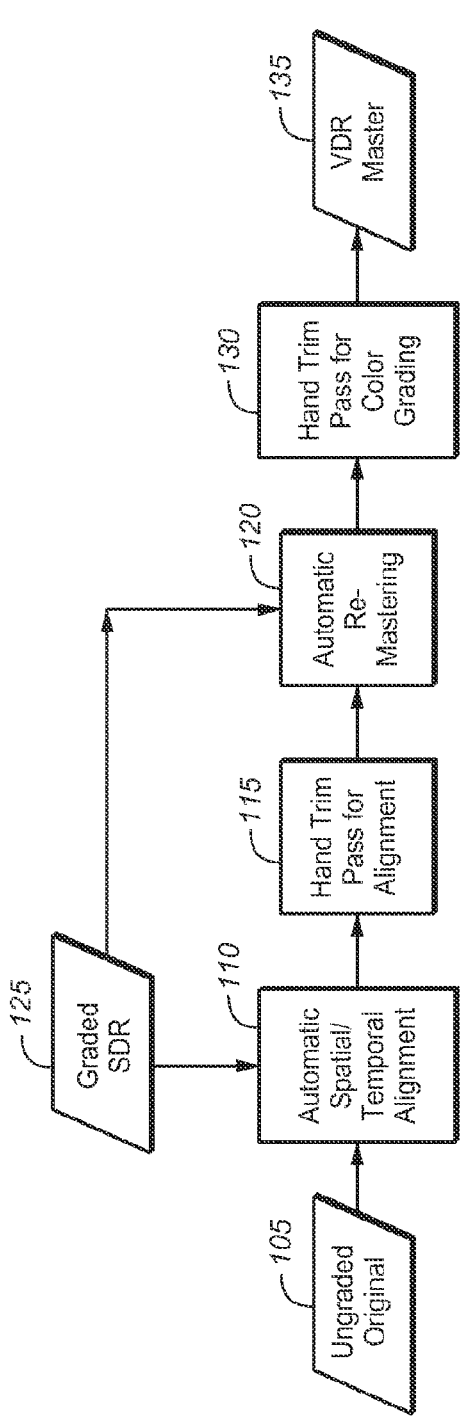
FIG. 1 illustrates an overview of one embodiment of a SDR guided VDR grading system.

In a first aspect of the disclosure, a method to perform color grading is described, the method comprising: providing, by a computer, an ungraded image; providing, by a computer, a color graded lower dynamic range image; and color grading, by a computer, the ungraded image based on the color graded lower dynamic range image, thereby obtaining a higher dynamic range color graded image.

In a second aspect of the disclosure, a method to perform color grading is described, the method comprising: providing, by a computer, an ungraded image; providing, by a computer, a color graded lower dynamic range image; applying, by a computer, an inverse tone and gamut mapping transformation to the color graded lower dynamic range image, thereby obtaining an inversely mapped lower dynamic range image; providing, by a computer, a higher dynamic range editing, based on the ungraded image; and applying, by a computer, a color transformation to the ungraded image, based on the higher dynamic range editing and the inversely mapped lower dynamic range image, thereby obtaining a higher dynamic range master image.

In a third aspect of the disclosure, a method to perform color grading is described, the method comprising: removing, by a computer, at least one first special handling region from an ungraded image, thereby obtaining at least one first special handling region and a first remaining data; removing, by a computer, at least one second special handling region from a color graded lower dynamic range image, thereby obtaining a second remaining data; estimating, by a computer, a global color transformation based on the first and second remaining data, wherein the global color transformation comprises minimizing a difference between the ungraded image and the color graded lower dynamic range image; processing, by a computer, the at least one first special handling region, thereby obtaining at least one processed special region; estimating, by a computer, a local color transformation for at least one local area; and combining, by a computer, the global and local color transformations based on the at least one processed special region.

DETAILED DESCRIPTION

As used herein, the term 'dynamic range' (DR) may relate to a capability of the human visual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or opthalmological sense) have an intensity range that spans about 15 orders of magnitude. Adapted humans may perceive dim light sources of a few photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the term 'visual dynamic range' (VDR) may relate to the DR that is simultaneously perceivable by a HVS. As used herein, VDR may relate to a DR that spans 5-6 orders of magnitude, however it is not intended to be limited to any span of dynamic range, and VDR may be narrower or equal to HDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR) or standard dynamic range (SDR), in relation to VDR and HDR. Digital cinema systems exhibit some of the same limitations as other display devices. In the present application, "visual dynamic range (VDR)" is intended to indicate any extended dynamic range, which is wider than LDR or SDR, and may be narrower or equal to HDR. A SDR image may, for example, be 48 nits cinema content or 100 nits Blu-ray content. VDR may also be expressed interchangeably, as EDR (Enhanced dynamic range). In general, the methods of the present disclosure relate to any dynamic range higher than SDR.

Advances in the underlying technology of digital cinema will allow future digital cinema systems to render image and video content with significant improvements in various quality characteristics over the same content, as rendered on today's digital cinema systems. For example, future digital cinema systems may be capable of a DR (e.g. VDR) that is higher than the SDR/LDR of conventional digital cinema systems as well as a larger color gamut than the color gamut of conventional digital cinema systems.

Herein and in the following, by "signal" a physical, electrical signal is intended, for example, a digital bitstream to represent an image or parameters related to image processing. Such signal (or image) processing can introduce a loss in image quality, one reason being the difference between the input signals used in the processing at the transmitting and receiving ends, respectively.

The present disclosure describes systems and methods to generate a visual dynamic range (VDR) graded video, based on the raw data and a standard dynamic range (SDR) grade of the same material. By 'grading' it is intended herein color grading, or the process of altering and/or enhancing the color of a video or image.

By 'raw data' it is intended herein a video or image which has not been color graded.

Specifically, the present disclosure describes systems and methods for color grading of raw (ungraded) content into a VDR video sequence by taking into consideration a previously graded SDR version.

As understood by the person skilled in the art, a method may be termed automatic if it's executed by a computer without human supervision of every detail of the execution. A hand pass, by contrast, is also executed by a computer, but it comprises some direct, live, human supervision that may direct, check or otherwise guide the computer's operation.

The systems and methods of the present disclosure may be used, for example, for: automatic temporal and spatial alignment between a SDR image and a raw (ungraded) image; inverse tone-mapping; estimating color transformations and secondary color grading; automatic re-mastering. This list of possible applications is not intended as a limitation of possible uses.

In some embodiments of the disclosure, color regrading comprises both primary color grading and secondary color grading, as well as allowing for special handling regions of a video or image. The meaning of primary and secondary color grading procedures will be understood by the person skilled in the art.

The creation of VDR content may usually comprise editing raw footages to be color graded to VDR range by colorists to reflect director's intention, while monitoring the resulting VDR master on a high dynamic range display. The VDR range may refer, for example, to a luminance range comprising 0.005 nits to 10,000 nits. The resulting VDR master can then normally be archived and mapped to different versions (different dynamic ranges and color gamuts) by a trim pass which can be relatively inexpensive (computationally) compared to regular color grading pass. However, the color grading step from the edited raw footage to a VDR master still normally takes a lot of efforts and time.

For a new film going through a VDR workflow, color grading of raw footage might be a necessary step in post-production. However, for existing films which have already been color graded to one or more SDR versions instead of to a VDR version, it may be possible to employ system and methods to speed up the color grading of the original image to a VDR master, such as described in the present disclosure.

In several embodiments, the SDR version not only provides guidance on spatial and temporal editing decisions, but also provides guidance on how to perform the color correction.

FIG. 1 illustrates an overview of one embodiment of a SDR guided VDR grading system. An ungraded original (raw) image or video (105) can undergo an automatic spatial and/or temporal alignment (110), and subsequently a hand trim pass (115) and automatic re-mastering (120). The graded SDR image (125), corresponding to the raw image (105), can be employed in steps (110) and (120).

A subsequent step may comprise a hand trim pass for color grading (130), prior to obtaining the VDR master image (135).

In FIG. 1, the ungraded original (105) may refer to different versions of the ungraded material, including film scans, digital intermediates, raw camera data, etc., while the graded SDR image (125) may refer to different standard dynamic range (SDR) versions, for example, a 48 nits P3 cinema version, or a 100 nits Rec709 Blu-ray disc version. The method of FIG. 1 could be scene-by-scene based.

In several embodiments, for each scene in graded SDR (125), the corresponding scene in the ungraded original material (105) is known.

In step (110) an automatic spatial and temporal alignment can be applied to the raw image (105), in order to obtain an ungraded original version of aligned content which is spatially and temporally aligned with the graded SDR (125).

In other words, the temporal cut locations and pan-&-scan boxes can be found so that the aligned original image and graded SDR image are matched pixel by pixel.

A hand trim pass (115) can be provided for this spatial and temporal alignment steps. Step (115) could serve multiple purposes, for example: the directors might want to cut the VDR scene differently from the SDR scene, spatially and temporally, and step (115) can provide the required flexibility for that purpose. In another example, the hand trim pass (115) can provide a quality control step so that any error occurred in the automatic alignment (110) can be corrected before entering into the automatic re-mastering step (120).

After step (115), the spatial and temporal content is color graded to the VDR range, with the same grading intention as in the graded SDR version, via the automatic re-mastering step (120). Hand trim pass (130) may be necessary here to obtain the director's approval since the automatic re-mastering (120) results might need to be fine-tuned to meet the director's intentions.

The above process may be scene-based, and a scene may comprise one frame, or several frames. In each step of spatial/temporal alignment (110) and automatic re-mastering (120), if there are differences among the frames within one scene, the method of FIG. 1 may fall back to being frame-based.

Automatic Spatial and Temporal Alignment

Example embodiments of step (110) may be described in more details as follows.

In several embodiments, given a scene in graded SDR, temporal alignment may be executed first. If there is no change in frame rate, the method may comprise finding one frame in the ungraded original corresponding to a frame in the graded SDR content. If the frame rate is different, it may be advantageous to find out more than one corresponding frame from which it can be possible to determine the frame rate ratio between the ungraded original and the graded SDR content.

In order to obtain more robust results, in both cases, that with a change in frame rate and that with no change in frame rate, it may be advantageous to choose a number of candidate frames in the graded SDR scene, and find out their corresponding frames in the ungraded original. Motion analysis may be needed to determine whether there are static frames in the scene, and to remove the repeating frames so that a one to one mapping can be found for the candidate frames.

For temporal alignment, methods based on metadata may be able to address certain cases with decreased relative complexity, where no significant amount of spatial and color changes are present between the two frame sequences which are to be aligned.

In cases where there is increased complexity as there are substantial spatial (e.g., due to cropping) and color differences (e.g., due to grading) between ungraded original and graded SDR frames, a more robust method may need to be applied, based on features that are invariant to spatial and color transformations.

Specifically, in several embodiments of the present disclosure, invariant feature points may be extracted from each of the chosen candidate frames in a graded SDR image. Using the same method, feature points can also be extracted from each of the non-repeating frames of the ungraded original. Detecting invariant feature points within an image is a common task in computer vision. A comparison of detection methods is described for example in Mikolajczyk et al., *A comparison of affine region detectors*, IJCV 65(1/2):43-72, 2005, herein incorporated by reference in its entirety.

As the person skilled in the art will understand, many different methods for feature point detection can be used. After detecting the local feature points, many different descriptors may be employed to characterize the local regions, i.e., to extract their distinctive signatures, comprising using scale invariant feature transform (SIFT), gradient location and orientation histogram (GLOH), and speeded up robust features (SURF), among others. SIFT is described, for example, in Lowe. *Distinctive image features from scale-invariant keypoints*, IJCV, 60(2):91-110, November 2004, herein incorporated by reference in its entirety. GLOH is described, for example, in Mikolajczyk et al., *A performance evaluation of local descriptors*. In PAMI 27(10): 1615-1630, 2004, herein incorporated by reference in its entirety. SURF is described, for example, in Bay, et al., *SURF: Speeded Up Robust Features*, ECCV, pp. 404-417, 2008, herein incorporated by reference in its entirety.

If two sets of descriptors are obtained from two different images, matches can be computed based on the similarity of the descriptors. Thus it may be possible to find out the best matched frames in the ungraded original for each of the chosen frames in the graded SDR. This process could be done in the other direction, i.e., choosing candidate frames in ungraded original and finding their best matches in graded SDR.

After finding out the best one-to-one matches, an estimation can be done for the temporal shift. For example, random sample consensus (RANSAC), as described for example in Fischler et al., *Random sample consensus: A paradigm for model fitting with applications to image analysis and automated cartography*. CACM, 24(6):381-395, June 1981, incorporated herein by reference in its entirety, could be used to estimate the temporal shift together with the frame rate ratio between the ungraded original and the graded SDR. RANSAC can provide robust results, as long as there is a percentage of true matches, and the error matches are random.

In some embodiments, a method to estimate the temporal shift and the frame ratio using RANSAC comprises the following steps:

randomly picking two pairs of corresponding frames, S1, S2, and U1, U2, where frame S1, S2 in the graded SDR are matched to frame U1 and U2 in the ungraded original, respectively. If $(U1-U2)*(S1-S2)<=0$, repeat step i;

estimating the temporal shift and the frame ratio, where the temporal shift equals $S1-U1$, and the frame ratio equals $(U2-U1)/(S2-S1)$;

for all the corresponding frame number pairs, checking how many of the frame numbers have consensus with the model calculated in step ii, recording the maximum consensus rate and its corresponding shift and ratio;

if the above steps are repeated for a certain number, ending the process and output the best shift, ratio, and anchor location of S1, otherwise, repeating from step i.

After the ungraded original and the graded SDR are temporally aligned, a spatial alignment may take place. The spatial alignment may be carried out by matching the extracted feature points of matching frames and estimating a spatial transformation between the two frames. This step may be necessary as there might be resolution changes and pan and scans in many cases, from the original image to the graded SDR image. For example, the original might have a 4K resolution, while the graded SDR might be 1080p.

As understood by the person skilled in the art, other methods, similarly to the way the RANSAC method is applied above, may be applied to obtain a parametric spatial transformation model from the coordinates of the matching feature points of the entire scene, if the spatial transformation is time invariant within the scene. In some embodiments, a six parameters affine transformation can be estimated between the ungraded original and the graded SDR images.

Figure 2:
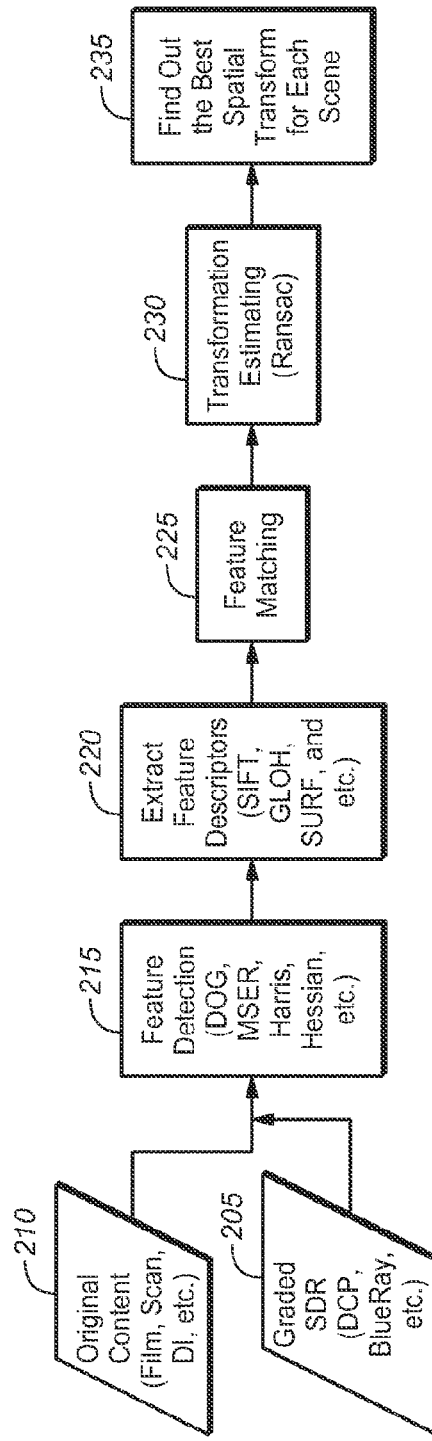
FIG. 2 shows an overview of one embodiment of spatial alignment.

FIG. 2 shows an overview of one embodiment of spatial alignment. The original content (210) and graded SRD content (205) undergo a feature detection step (215). Feature descriptors can be extracted (220), and subsequently matched (225). A transformation estimate is carried out, for example using RANSAC (230), in order to find an optimal spatial transformation (235).

In some cases, a pan-and-scan process may be time variant within a scene. In that case, the spatial transformation can be estimated frame by frame, and from the estimated frame-wise spatial transformation, the temporal changes of the pan-and-scan may also be modeled.

After the content is aligned both temporally and spatially, it is now possible to obtain an aligned content that only has color differences relative to the graded SDR. The aligned content can then help an automatic re-mastering step so that the colors in graded SDR can be used to guide the color grading of the ungraded original.

A hand trim pass for alignment may be necessary after the automatic alignment is performed. The hand trim pass could correct any possible errors in automatic alignment, and also allow for different editing decisions for VDR images so that VDR grade images can be spatially and temporally different from the SDR versions. In this case, the automatic VDR remastering can still use the aligned content to help estimate the color transformation, and apply the estimated transformation to the edited VDR version of the original to obtain a VDR master.

Automatic Re-Mastering

One of the concepts underlying automatic re-mastering (e.g., 120) is that all the raw information may be available in the ungraded original, and the graded SDR can provide a way on how color correction is performed when the target display is SDR display. Although the SDR and the VDR display might have different dynamic range and color gamut, the director's intention can be kept the same for those colors within the range of 3D color gamut. In the cases when the graded SDR image has color clipping due to its limited dynamic range and color gamut, the lost information could be recovered from the ungraded original. Another possible advantage is that when there is a different edit decision between SDR and VDR, the same director's intention could be applied to the new content. For example, the VDR image might have a different edit to better tell the story, or have a different cropping or spatial format.

In some embodiments, an inverse tone mapping and a gamut mapping are applied first to the graded SDR, given the information about the dynamic range and color gamut of the target VDR master. After mapping step, the color transformation can be modeled between the ungraded original and the inverse mapped result, where the clipped areas will become outliers of the estimated transformation due to clipping. The modeled color transformation can then be applied back to the ungraded original to obtain a re-mastering result.

FIG. 3 shows an overview of the main steps of one embodiment of automatic re-mastering, for a specific case where the SDR content is a 100 nits Rec709 version, and the output VDR content is a 4000 nits P3 version.

A graded SDR image, 100 nits Rec709, (305) is provided. Inverse tone mapping and color gamut mapping (310) are applied to image (305), thereby obtaining an inverse mapped image (315).

The ungraded original image (320) can then be used for spatial alignment (325). A global color transformation estimation (330) is obtained from the mapped image (315) and the ungraded alignment (325). VDR-specific editing (340) can also be performed on the ungraded original (320). The VDR-specific edited image could be a spatially and temporally aligned ungraded original, or a version with different cropping or a different cut.

A color transformation function (335) is obtained after the estimation (330), and a color transfer can be applied (345). A VDR master version (350), 4000 nits P3 in this example, is obtained as output of the process in FIG. 3.

In other embodiments, the inverse tone mapping and color gamut mapping can be further illustrated as in FIG. 4.

The input in the example of FIG. 4 is a SDR image (405), 100 nits Rec709 with gamma 2.4. In a first step gamma decoding (410) is performed to obtain a linear RGB image. Then color space conversion is applied to IPT space (415). In some embodiment, PQ encoding may be used for the values in IPT space.

An inverse tone mapping curve (425) can then be applied to the SDR content. Afterwards, saturation correction (430) can be applied and the colors can be converted back to RGB space with P3 gamma 2.4 (435), thereby obtaining a VDR graded image (440).

As understood by the person skilled in the art, any inverse tone mapping and gamut mapping can be used in the systems and methods of the present disclosure, to obtain an inverse mapped image version from the graded SDR image. The inverse mapping will not recover the lost information due to clipping of the dynamic range and the color gamut. However, since the appearance of an image in its inverse mapped version will be similar to the graded SDR version, the inverse mapped image can clarify the director's intention for color grading. The director's intention can be used to guide the global color grading process from the ungraded original, where that lost information is still available.

Estimation of Color Transformation

Given a set of corresponding colors between an ungraded original image and an inversely mapped image, it is possible to estimate a global color transformation using the RANSAC method. Before applying RANSAC, the corresponding colors to be used need to be determined first, as well as a color transformation model. In one embodiment, an adaptive sampling scheme can be applied, to obtain a subset of corresponding colors. Since the images are temporally and spatially aligned, each pair of pixels within the entire scene could provide a pair of corresponding colors. However, there may be too many pixel pairs and using all of them would be redundant, thus a sampling may be advantageous. At the same time, the distribution of the intensity is content-dependent. It would be advantageous to model the global color transformation accurately across all luminance levels, hence several embodiments of the present disclosure can apply an adaptive sampling scheme to sample the corresponding colors so that the resulting samples have a near-uniform distribution of intensity. This way, the estimated curves would have better performance in those regions where the original distribution is low, for example at the high end and low end of the intensity range.

After the sampled pairs of corresponding colors are obtained, a global transformation model needs to be determined. The chosen model may be suited for fitting the data in an optimal way. In one embodiment, three one-dimensional curves are employed to model the color transformation in three different color components. In this embodiment, each of the three curves is employed to fit one of the three color component. Each one-dimensional function could be parametric. For example, a polynomial, piecewise polynomial, or other functions may be used, as understood by the person skilled in the art. A model based on a look-up table may also be used, for example with cubic interpolation between the look-up entries for each one dimensional fitting function.

In certain situations, the one dimensional functions may not have the desired accuracy. In this case, more complex models may be used. For example, the global color transformation may be modeled with a 3×3 linear matrix transformation, followed by three one-dimensional curves. In several embodiments, RANSAC may be used to estimate the global color transform once the data set and transformation model are determined.

One advantage of applying RANSAC to fit a model comprises its robustness to outliers. This may be relevant as there may be outliers in fitting a model. For example, clipped colors due to limited dynamic range and color gamut may be outliers to the model. After applying the estimated color transform back to the ungraded original image, these outliers may be color-graded correctly again.

Consideration of Secondary Grading and Special Handling Regions

In certain situations there may be local color grading, i.e. secondary color grading, applied to the content graded to SDR. In those cases, both the clipped pixels of an image and those pixels underlying local color grading would become outlier for the estimated global color transformation model step featured in several embodiments of the present disclosure, as described above.

Therefore, if there is a significant amount of outliers, a determination may have to be made on whether the outliers are due to the clippings or due to secondary color grading. The outlier colors in the graded SDR content can be compared to the 3D boundary of the color gamut and of the dynamic range. If the color is near the boundary, it can be determined that the outlier has originated from clipping; otherwise, the outlier might have originated from secondary grading. If there is a certain amount of outliers come from secondary grading, a first step can be to estimate a mask that identifies the local regions going through the secondary grading, and then estimate a secondary grading for these pixels using the same methods employed for estimating the global color transformation. The color transformation for secondary grading can then be applied back to the masked pixels in the ungraded original. The secondary graded regions can then be blended into the regions under primary grading.

In certain situations, there could be some regions that are graded differently for a SDR image and for a VDR image. When the target dynamic range is different, these regions will be graded differently. For example, the highlighted regions, like some light sources, in a SDR image can be crushed into small dynamic range at the high end, while they can occupy a larger dynamic range in a VDR image. For this example, it could be possible to first identify these regions, and then apply special handling to these regions, while the other regions are going through the same "standard" process as described above in the present disclosure. The special handling region could be added back after processing.

Figure 5:
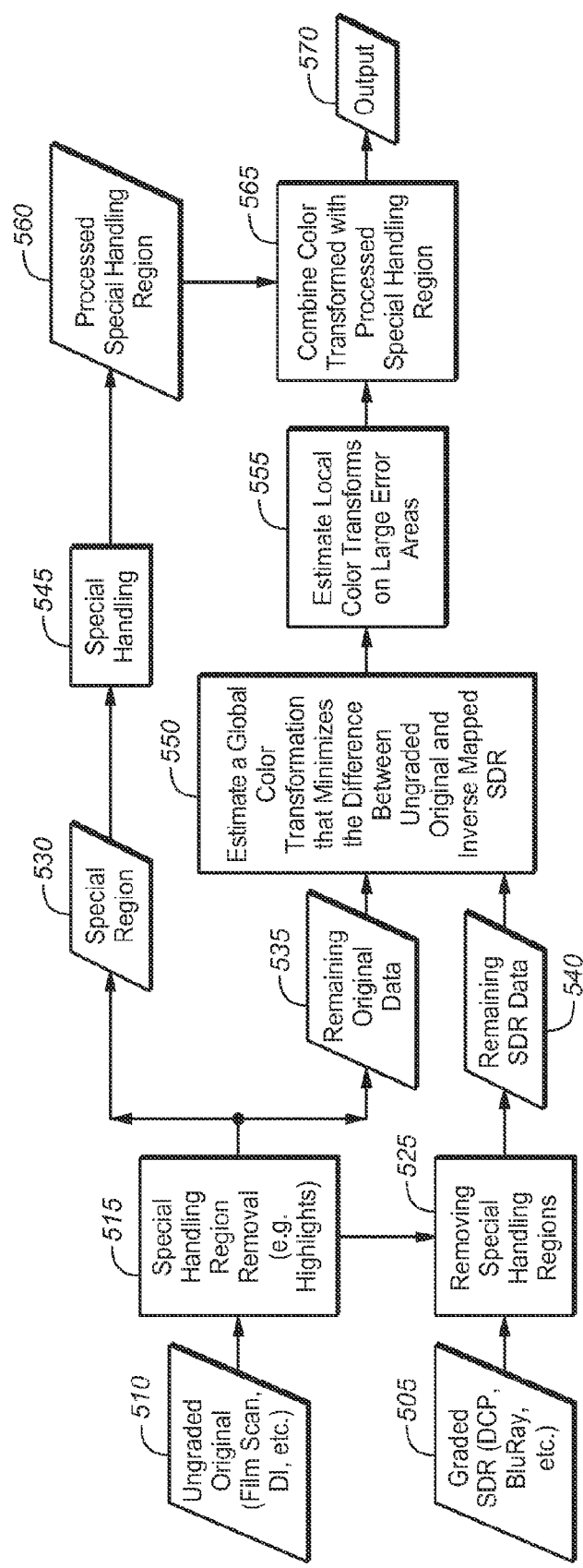
FIG. 5 illustrates an example of handling of special regions according to an embodiment of the present invention.

FIG. 5 illustrates an example of handling of special regions.

Special handling regions can be removed (515, 525) from the grade SDR image (505) or the ungraded original (510). For the case of the SDR image (505), data remaining (540) after removal (525) is employed together with data remaining (535) after removal (515), in order to estimate a global color transformation (550) which minimizes the difference between the ungraded original image (510) and the inversely mapped SDR image.

An estimation can then be done for a local color transformation (555) on areas with large errors, which have a large difference between the ungraded original image (510) and the inversely mapped SDR image. The special regions (530) undergo special handling (545), thereby obtaining processed special handling regions (560). Regions (560) are then combined (565) with the content transformed in step (555), obtaining a final output (570).

Although several embodiments of the methods described in the present disclosure comprise an alignment step, such methods may be performed also without such alignment. The color grading is then applied to the ungraded raw image based on an estimated color transformation.

Figure 6:
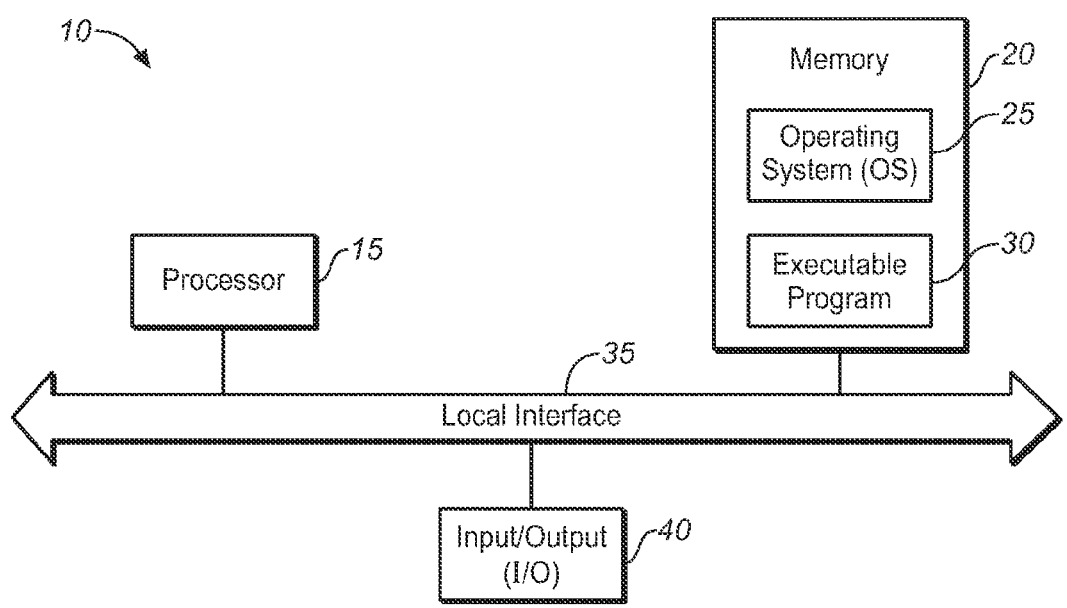
FIG. 6 depicts an exemplary embodiment of a target hardware for implementation of an embodiment of the present disclosure.

FIG. 6 is an exemplary embodiment of a target hardware (10) (e.g. a computer system) for implementing the embodiments of FIGS. 1-5. This target hardware comprises a processor (15), a memory bank (20), a local interface bus (35) and one or more Input/Output devices (40). The processor may execute one or more instructions related to the implementation of FIGS. 1-5, and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 6. In some embodiments a plurality of processors may be used in a parallel configuration for added execution speed. In such a case, the executable program may be specifically tailored to a parallel execution. Also, in some embodiments the processor (15) may execute part of the implementation of FIGS. 1-5, and some other part may be implemented using dedicated hardware/firmware placed at an Input/Output location accessible by the target hardware (10) via local interface (35). The target hardware (10) may include a plurality of executable program (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method to perform color grading for obtaining a higher dynamic range color graded image, the method comprising the following computer-implemented steps:
   providing an ungraded image;
   providing a color graded lower dynamic range image representing the same material as the ungraded image;
   spatially and temporally aligning the ungraded image and the color graded lower dynamic range image thereby obtaining an aligned ungraded image; and
   color grading the aligned ungraded image based on the color graded lower dynamic range image, thereby obtaining the higher dynamic range color graded image,
   wherein:
   (a) the spatially and temporally aligning comprises:
   detecting feature points in the ungraded image and in the color graded lower dynamic range image;
   matching the feature points; and
   estimating a transformation between the ungraded image and the color graded lower dynamic range image, based on the matching of the feature points, and
   (b) the detecting further comprises extracting feature descriptors in at least one local region of the ungraded image and at least one local region of the color graded lower dynamic range image, and wherein the matching further comprises matching the feature descriptors.

2. The method of claim 1, wherein the spatially and temporally aligning comprises applying a hand trim alignment pass.

3. The method of claim 1, wherein the color grading comprises applying a hand trim color grading pass.

4. The method of claim 1, wherein the image is a frame in a video.

5. The method of claim 1, wherein the spatially and temporally aligning comprises applying a hand trim alignment pass.

6. The method of claim 1, wherein the color grading comprises applying a hand trim color grading pass.

7. A method to perform color grading for obtaining a higher dynamic range master image, the method comprising the following computer-implemented steps:
   providing an ungraded image;
   providing a color graded lower dynamic range image representing the same material as the ungraded image;
   applying an inverse tone and gamut mapping transformation defined based on the dynamic range and color gamut of the higher dynamic range master image to the color graded lower dynamic range image, thereby obtaining an inversely mapped lower dynamic range image;
   providing a higher dynamic range editing, based on the ungraded image; and
   applying the higher dynamic range editing to the ungraded image to generate an edited ungraded image, and a color transformation to the edited ungraded image, wherein the color transformation is based on the ungraded image and the inversely mapped lower dynamic range image, thereby obtaining the higher dynamic range master image.

8. The method of claim 7, wherein the higher dynamic range editing comprises spatially and temporally aligning the ungraded image and the inversely mapped lower dynamic range image, thereby obtaining an aligned image, and wherein the step of applying a color transformation is applied to the aligned image, thereby obtaining the higher dynamic range master image.

9. The method of claim 8, further comprising the computer-implemented step of determining corresponding colors between the ungraded image and the inversely mapped lower dynamic range image, and wherein the applying a color transformation is further based on the corresponding colors.

10. The method of claim 9, wherein the determining corresponding colors comprises applying adaptive sampling.

11. The method of claim 10, wherein the adaptive sampling is based on having a near-uniform distribution of intensity.

12. The method of claim 9, wherein the color transformation comprises three one-dimensional functions for three color components.

13. The method of claim 12, wherein the one-dimensional functions are a polynomial or are based on a look-up table.

14. The method of claim 9, wherein the color transformation comprises a three by three linear matrix.

15. The method of claim 9, wherein the color transformation comprises color grading outlier pixels at least one additional time.

16. The method of claim 9, wherein the image is a frame in a video.

17. The method of claim 7, wherein the applying an inverse tone and gamut mapping transformation comprises the following computer-implemented steps:
   applying gamma decoding to the color graded lower dynamic range image in a first color space, thereby obtaining a gamma decoded first image;
   converting the gamma decoded first image from the first color space to a second color space, thereby obtaining a second image;
   applying a reverse tone mapping transformation to the second image, thereby obtaining a third image;
   applying a reverse saturation correction to the third image, thereby obtaining a fourth image; and
   converting the fourth image from the second color space to a third color space, thereby obtaining an inversely mapped lower dynamic range image.

18. The method of claim 7, wherein the image is a frame in a video.

* * * * *